United States Patent
Gupta et al.

(10) Patent No.: US 11,834,611 B2
(45) Date of Patent: Dec. 5, 2023

(54) REACTOR AND METHOD FOR ABLATIVE CENTRIFUGE PYROLYSIS

(71) Applicant: HIS MAJESTY THE KING IN RIGHT OF CANADA, AS REPRESENTED BY THE MINISTER OF NATURAL RESORUCES, Ottawa (CA)

(72) Inventors: Murlidhar Gupta, Kanata (CA); Andrew McFarlan, Stittsville (CA); Fernando Preto, Castlegar (CA); Karam Khosa, Ottawa (CA)

(73) Assignee: HIS MAJESTY THE KING IN RIGHT OF CANADA, REPRESENTED BY THE MINISTER OF NATURAL RESOURCES

(*) Notice: Subject to any disclaimer, the term of this patent is extended or adjusted under 35 U.S.C. 154(b) by 0 days.

(21) Appl. No.: 17/419,986

(22) PCT Filed: Jan. 15, 2020

(86) PCT No.: PCT/CA2020/050040
§ 371 (c)(1),
(2) Date: Jun. 30, 2021

(87) PCT Pub. No.: WO2020/146945
PCT Pub. Date: Jul. 23, 2020

(65) Prior Publication Data
US 2022/0081619 A1    Mar. 17, 2022

Related U.S. Application Data (60) Provisional application No. 62/793,783, filed on Jan. 17, 2019.

(51) Int. Cl.
C10B 49/04     (2006.01)
C10B 47/34     (2006.01)
(Continued)

(52) U.S. Cl.
CPC .............. *C10B 47/34* (2013.01); *C10B 47/44* (2013.01); *C10B 49/04* (2013.01); *C10B 53/02* (2013.01); *C10B 53/07* (2013.01)

(58) Field of Classification Search
None
See application file for complete search history.

(56) References Cited

U.S. PATENT DOCUMENTS 7,625,532 B2 * 12/2009 Bridgwater ............... B01J 8/10
                                                   422/204
7,935,227 B2    5/2011 Dam-Johansen et al.
(Continued)

FOREIGN PATENT DOCUMENTS

CN    103436298    12/2013
CN    103937518     7/2014
(Continued)

OTHER PUBLICATIONS

Canadian Intellectual Property Office ISA/CA, International Search Report and Written Opinion for Application PCT/CA2020-050040, 8 pages, Apr. 8, 2020, Gatineau, Quebec.
(Continued)

*Primary Examiner* — Jonathan Luke Pilcher
(74) *Attorney, Agent, or Firm* — McDonald Hopkins LLC (57) ABSTRACT

A reactor and a method for centrifuge pyrolysis of a feedstock. The reactor may comprise a cylindrical reactor vessel, a heated surface, a cylindrical rotor and rotor blades and is configured to provide centrifugal force and axial propagation to a solid feedstock for centrifuge pyrolysis. A method for centrifuge pyrolysis is also provided. The method may
(Continued)

comprise providing a reactor, providing a feedstock, producing heat in the inner wall of the reactor, rotating a rotor of the reactor and collecting the pyrolysis product. The reactor and the method of the invention may be used for ablative centrifuge pyrolysis of feedstock. The feedstock may be any organic feedstock such as biomass.

21 Claims, 8 Drawing Sheets

(51) Int. Cl.
*C10B 47/44* (2006.01)
*C10B 53/02* (2006.01)
*C10B 53/07* (2006.01)

(56) References Cited

U.S. PATENT DOCUMENTS

| | | | |
|---|---|---|---|
| 8,128,717 | B2 | 3/2012 | Linck et al. |
| 8,388,706 | B2 | 3/2013 | Ugolin |
| 3,551,294 | A1 | 10/2013 | Kelley |
| 9,487,659 | B2 | 11/2016 | Pech et al. |
| 9,494,038 | B2 | 11/2016 | Bushuev |
| 2002/0117388 | A1 | 8/2002 | Denison |
| 2005/0173237 | A1* | 8/2005 | Bridgwater ............... B01J 8/10 422/198 |
| 2006/0169572 | A1 | 8/2006 | Meier et al. |
| 2008/0006520 | A1 | 1/2008 | Badger et al. |
| 2010/0132258 | A1 | 6/2010 | Linck et al. |
| 2013/0199919 | A1 | 8/2013 | Li et al. |
| 2016/0053184 | A1 | 2/2016 | Wheeler et al. |
| 2017/0136431 | A1* | 5/2017 | Jensen ................... C10B 53/02 |

FOREIGN PATENT DOCUMENTS

| | | |
|---|---|---|
| CN | 203700295 | 7/2014 |
| CN | 107176779 | 9/2017 |
| DE | 2728455 | 1/1978 |
| RU | 2281313 | 8/2006 |
| RU | 2349623 | 3/2009 |
| WO | 2003057800 | 7/2003 |
| WO | 2015150265 | 10/2015 |

OTHER PUBLICATIONS

Peacocke, "Ablative Pyrolysis of Biomass", Oct. 1994, 57 pages, The University of Aston in Birmingham.
Patent Cooperation Treaty (PCT), International Search Report and Written Opinion for Application PCT/CA2020-050040 filed Jan. 15, 2020, dated Apr. 8, 2020, International Searching Authority, CA.

* cited by examiner

REACTOR AND METHOD FOR ABLATIVE CENTRIFUGE PYROLYSIS

CROSS-REFERENCE TO RELATED APPLICATION

This application is a 35 U.S.C. 371 national stage filing of PCT Application No. PCT/CA2020/050040 filed on Jan. 15, 2020, entitled "REACTOR AND METHOD FOR ABLATIVE CENTRIFUGE PYROLYSIS," which claims priority to U.S. Provisional Application No. 62/793,783 filed on Jan. 17, 2019 each of which are incorporated by reference herein in their entireties.

TECHNICAL FIELD

The present invention relates to fast pyrolysis of feedstock. More specifically, the present invention relates to a reactor and a method for ablative centrifuge pyrolysis.

BACKGROUND

Pyrolysis is a process whereby particles of feedstock are heated in absence of air between 400-600° C. to produce primarily pyrolysis solids, liquids, and gaseous streams. Heat transfer rates play an important role for qualitative and quantitative distribution of solid and liquid yields. Depending upon heating rates of the particles and residence time of the vapours within the pyrolysis settings, pyrolysis is further classified as slow, medium, and fast pyrolysis. Rapid heating results in increased release of volatiles, whereas slow heating rate results in increased production of solids. It is widely reported that higher heating rates (>300° C./sec) in fast pyrolysis produce higher proportions of liquids when the residence time of vapours is kept below 2 sec. Many reactor configurations have been proposed for fast pyrolysis with a view to achieving high heat transfer rates. Known configurations include shallow moving bed or transported beds (vacuum pyrolysis), fluid beds, and ablative reactors.

In moving bed vacuum pyrolysis reactors, high heating rates are achieved by indirect heat transfer in a moving bed through a high temperature molten salt loop. The reduced residence time is achieved by removing pyrolysis vapours under vacuum conditions for quick quenching. While moving bed pyrolysis processes are capable of handling large particle size distribution and a wide range of feedstocks, including plastics and waste tires, the indirect heat transfer and the vacuum conditions are limiting factors and a major constraint in the development of a compact moving bed vacuum pyrolysis unit.

In fast pyrolysis fluid bed reactors, high heat transfer rates are achieved by reducing the feedstock to very small particle sizes to thereby increase the surface area and to transfer heat through direct exposure to a heat carrier such as hot fluidizing gas (e.g. nitrogen) and heated sand particles. Although some fluid bed pyrolysis reactors have been used at demonstration scale, inherent requirements of very small particle sizes (1-3 mm) will increase milling costs and energy consumption. In addition, the process requires large volumes of gas to be heated, cooled, and separated for recycling.

In the ablative pyrolysis process, particles are pressed against a heating surface while the particles are in relative motion with respect to the heating surface. Due to rapid surface renewal of particles, very high heating rates (as high as $5 \times 10^{5}$° C./s) can be achieved. Since the pyrolysis reactions are not kinetically controlled but are, rather, primarily controlled by the heat transfer mechanisms, the ablative process facilitates pyrolysis of large particles.

More recently, development of ablative reactors has taken different directions. In one approach (termed the vortex/cyclone approach), particles are suspended in a flow of high supersonic velocities to provide enough centrifugal forces to press the particles against the heated reactor surface. Although simple in design, a drawback of reactors using this approach is the need for large volumes of carrier gases relative to feedstock. Besides cost escalation, a large volume of gases leads to cumbersome gas separation as well as thermodynamic penalties. Thus, a major problem resides in the use of an appropriate mechanism to apply the required force on small and/or large particles in a continuous pyrolysis reactor.

One alternative is a continuous centrifuge pyrolizer. In this alternative, the particles need to be subjected to primarily three forces:
  i) a centrifugal force perpendicular to the heated wall;
  ii) an ablative force in the tangential direction; and
  iii) a propagation force that propagates the particles in the axial direction and that distributes the particles evenly on the reactor surface prior to their exit from the pyrolysis equipment. In the absence of any suitable axial propagation, particles will get stuck and accumulate inside the reactor and will thus cause clogging and will lead to a limitation on the reactor capacity.

Figure 1:
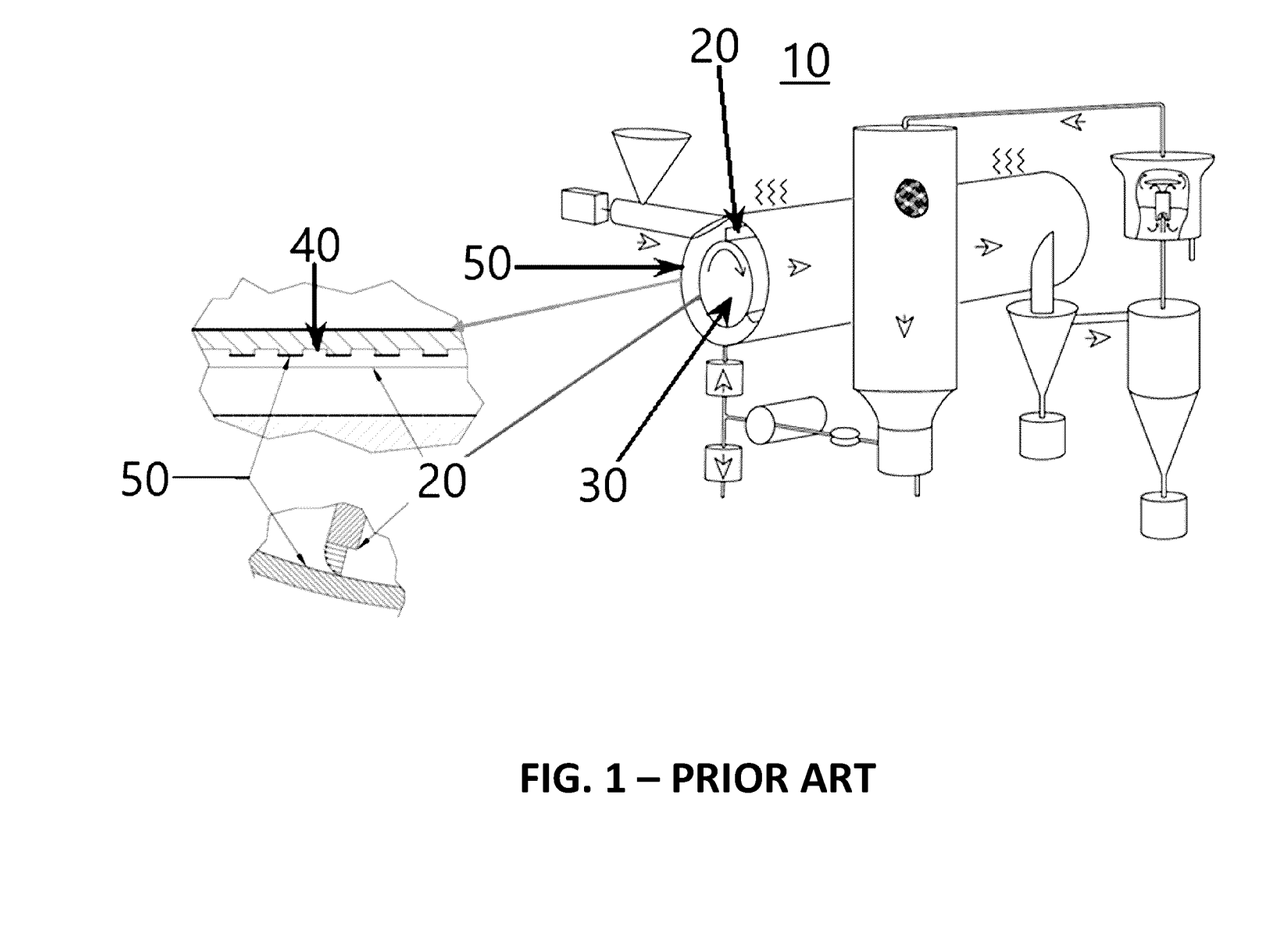
FIG. 1 illustrates an exemplary centrifuge pyrolysis reactor known in the art.

A recent approach has been proposed using a thermomechanical rotor at very high rotational speeds to create the high centrifugal accelerations (4-17 kG) to press the particles against the heated walls of a concentric shell (FIG. 1). In this approach, the forces for centrifugal ablation (i and ii noted above) are provided in reactor 10 by blades 20 mounted perpendicular to the rotor 30 with the rotor being capable of running at very high rpm speeds. The blades 20 do not provide any motion in the axial direction. Instead, the axial motion (see iii above) is provided by spirally twisted flow guide rings 40 welded on to the inner surface of the heated wall 50 of the reactor 10, as shown on the enlarged views. These kinds of guiding rings 40 are difficult to weld on the reactor wall 50 and their integrity is difficult to maintain in a continuous pyrolysis process. If the particle size of the feedstock changes, the guiding rings need to be changed, leading to an expensive and time-consuming process.

In view of the above, there remains a need to develop reactors for fast pyrolysis which are efficient, versatile, and simpler to construct.

SUMMARY

The present invention provides a reactor and a method for centrifuge pyrolysis of feedstock. The reactor of the invention comprises a cylindrical reactor vessel, a heated surface, a cylindrical rotor, and rotor blades.

In a first aspect, the present invention provides a reactor for centrifuge pyrolysis of a feedstock, the reactor comprising:
  a cylindrical reactor vessel having a first end and a second end, and having an inlet proximal to the first end for receiving the feedstock and an outlet proximal to the second end for discharging at least one pyrolysis product;
  a heated surface defining an inner wall of the cylindrical reactor vessel;
  a cylindrical rotor concentric to the cylindrical reactor vessel along a longitudinal central axis; and at least one rotor blade coupled to the rotor along a length of the rotor at an angle θ to a circumferential plane of the rotor;

wherein the cylindrical rotor is for rotation about the longitudinal central axis to impel a centrifugal force to the feedstock for contacting the heated surface to thereby result in the at least one pyrolysis product; and wherein the at least one rotor blade is configured for facilitating propagation of the feedstock in the axial direction from the first end to the second end.

In a second aspect, the present invention provides a method for centrifuge pyrolysis of a feedstock, the method comprising:

a) providing a reactor comprising:
  a cylindrical reactor vessel having a first end and a second end, and having an inlet proximal to the first end for receiving the feedstock and an outlet proximal to the second end for discharging at least one pyrolysis product;
  a heated surface defining an inner wall of the cylindrical reactor vessel;
  a cylindrical rotor concentric to the cylindrical reactor vessel along a longitudinal central axis; and
  at least one rotor blade coupled to the rotor along a length of the rotor at an angle θ to a circumferential plane of the rotor;
  wherein the cylindrical rotor is for rotation about the longitudinal central axis to impel a centrifugal force to the feedstock for contacting the heated surface to provide the at least one pyrolysis product; and
  wherein that at least one rotor blade is configured for facilitating propagation of the feedstock in the axial direction from the first end to the second end;
b) providing the feedstock in the inlet of the reactor;
c) generating heat at the heated surface;
d) rotating the cylindrical rotor for centrifuge pyrolysis of the feedstock; and
e) collecting the at least one pyrolysis product from the outlet of the reactor.

BRIEF DESCRIPTION OF THE DRAWINGS

The present invention will now be described by reference to the following figures, in which identical reference numerals refer to identical elements and in which:

FIGS. 3A-3D are views of a cylindrical reactor vessel according to one embodiment of the present invention in which: FIG. 3B is a top view of the cylindrical reactor vessel; FIG. 3C is an end view of the cylindrical reactor vessel.

DETAILED DESCRIPTION

The present invention relates to a reactor and a method for centrifuge pyrolysis of a feedstock. The reactor of the invention comprises a cylindrical reactor vessel, a heated surface, a cylindrical rotor, and rotor blades and is configured to provide centrifugal force and axial propagation to a solid feedstock for centrifuge pyrolysis. A method for centrifuge pyrolysis is also provided. The method comprises providing a reactor, providing a feedstock, producing heat at the inner wall of the reactor, rotating a rotor of the reactor and collecting the pyrolysis product. The reactor and the method of the invention may be used for ablative centrifuge pyrolysis of feedstock. The feedstock may be any organic feedstock such as biomass or other organic waste including agriculture and forestry residues, municipal solid waste (MSW), construction and demolition (C&D) residues including plastics etc. The reactor may accommodate feedstock of a wide range of particle sizes. For example, the particle size may be as low as 0.1 mm. The upper limit will be determined by the dimensions of the reactor. For example, the particle size may be up to 25 mm.

One or more objects of the invention may be achieved by providing a reactor comprising a cylindrical reactor vessel. The cylindrical reactor vessel has a first end and a second end. At least one inlet is located near the first end. Optionally, more than one inlet may be located near the first end. The inlet is for receiving the feedstock to be treated and for introducing said feedstock within the cylindrical reactor vessel. In some embodiments, the inlet is provided with a feeding system for controlling feed rates therein.

At least one outlet is located near the second end. Optionally, more than one outlet may be provided near the second end. The outlet is for discharging at least one pyrolysis product from within the cylindrical reactor vessel. The outlet may be connected to at least one apparatus for further treatment of the pyrolysis products, (e.g. separation, condensation, settling for phase separation, etc.).

The inner wall of the cylindrical reactor vessel may be defined by a heated surface. The heated surface may be heated at a temperature sufficient to achieve pyrolysis of the feedstock. Preferably, the temperature of the heated surface is between 300° C. and 650° C., and more preferably between 450° C.-550° C.

The reactor also comprises a cylindrical rotor concentric to the cylindrical reactor vessel, i.e. the cylindrical rotor is inside the cylindrical reactor and the two share a common longitudinal axis at their centers. The cylindrical rotor is for rotation about the longitudinal axis and this axis is defined by a shaft for mounting the cylindrical rotor. The rotor is coupled to a motor for providing torque to the rotor assembly. The speed of rotation may be from 500 rpm to 20,000 rpm, preferably from 2,000 rpm to 10,000 rpm. Rotation of the rotor impels a centrifugal force to the feedstock in a direction perpendicular to the heated surface such that the particles of the feedstock may contact the heated surface and undergo pyrolysis to generate at least one pyrolysis product. For example, pyrolysis products of a biomass feedstock may be char, pyrolysis gases and pyrolysis liquids such as bio-oil, etc.

The cylindrical rotor is also provided with at least one rotor blade coupled along the length of the rotor. Preferably, 2 to 5 rotor blades are provided on the cylindrical rotor. The rotor blades are coupled at an angle θ about the circumferential plane of the rotor. Multiple rotor blades may be coupled at the same angle or each rotor blade may be independent of one another at different variable angles. Such configurations may facilitate propagation of the feedstock and pyrolysis products in an axial direction such that the feedstock and the pyrolysis products are propelled from the first end to the second end of the reactor vessel. The rotation of the rotor and propagation of the feedstock may create an in-situ draft within the vessel to further facilitate propagation. In a preferred embodiment, the in-situ induced draft generated is sufficient to propagate substantially all the feedstock and pyrolysis products from the first end to the second end such that other means of propagation, such as a carrier gas, an external fan or a compressor, are not necessary. This may result in simplifying the fabrication of the reactor and a reduction of the reactor's volume and costs.

It may also be noted that the efficiency of propagation of the feedstock and pyrolysis products may reduce the residence time of the particles within the vessel, and therefore significantly improve the pyrolysis process and the quality of the products. As previously noted, many parameters could be varied for optimization of the pyrolysis process, such as the temperature, the rotation speed, and the configuration of the rotor blades. Other parameters, such as the length of the reactor vessel, would also affect the residence and overall efficiency. To further improve propagation, the reactor unit may be mounted in a tilted position from the horizontal axis. The particles may thus be subjected to an axial component of gravity to allow for the propagation from the first end to the second end of the reactor vessel.

In some embodiments of the present invention, the reactor components are made of stainless steel, such as SS304 and SS316, or other alloy steels. However, a skilled person would appreciate that any material resistant to high temperature and corrosion may be used for the fabrication of the reactor components. The reactor may also be provided with exhaust relief valves, seals, and control means that regulate parameters such as speed of rotation, temperatures, and feeding rates, as deemed necessary.

Figure 2:
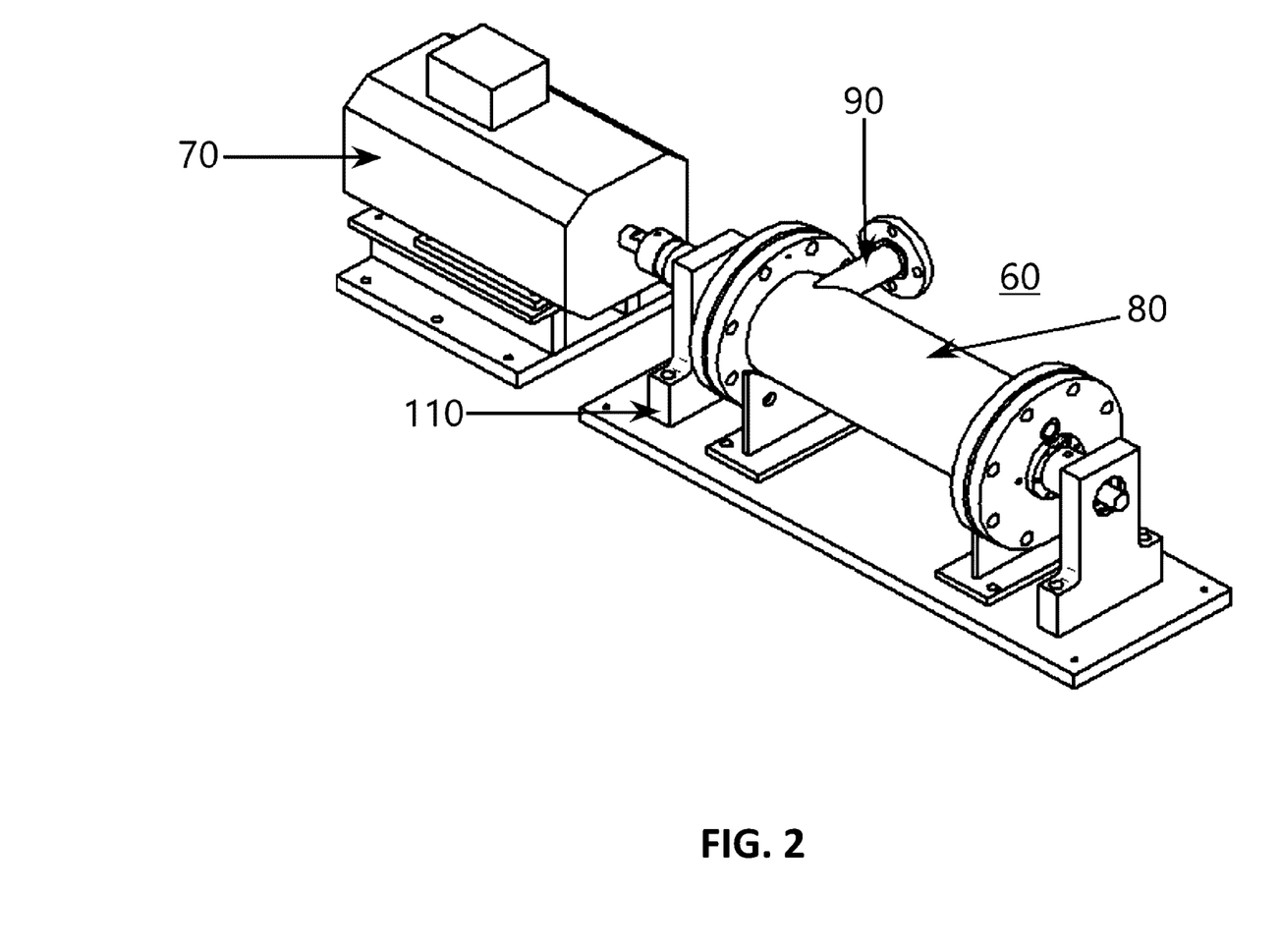
FIG. 2 is a perspective view of a reactor and motor assembly according to one embodiment of the present invention.

Referring now to FIG. 2, a reactor and motor assembly according to one embodiment of the present invention is shown in a perspective view. A reactor 60 is shown coupled to a motor (not shown) inside a protective casing 70. The reactor 60 comprises a cylindrical reactor vessel 80 having an inlet 90 and an outlet (not shown). In this exemplary embodiment, the reactor 60 is mounted on a frame 110. Within reactor 60 is the rotor assembly, not visible in the present Figure but shown in isolation in FIG. 4, as explained below.

Figure 3A:
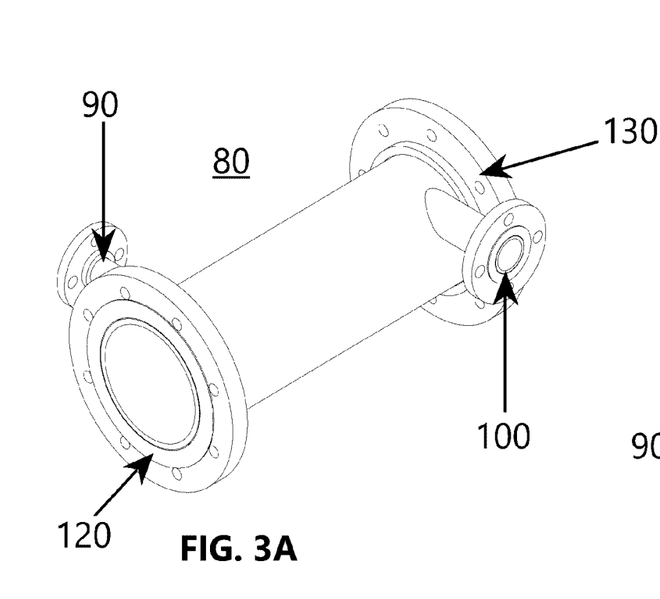
FIG. 3A is a perspective view of the cylindrical reactor vessel.
Figure 3B:
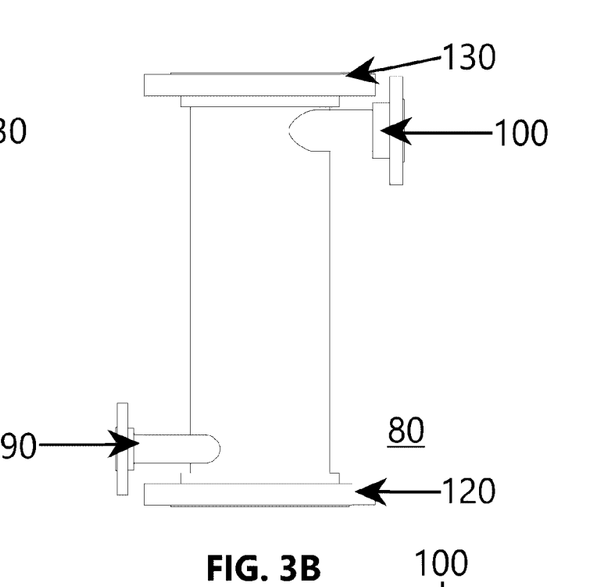
Figure 3C:
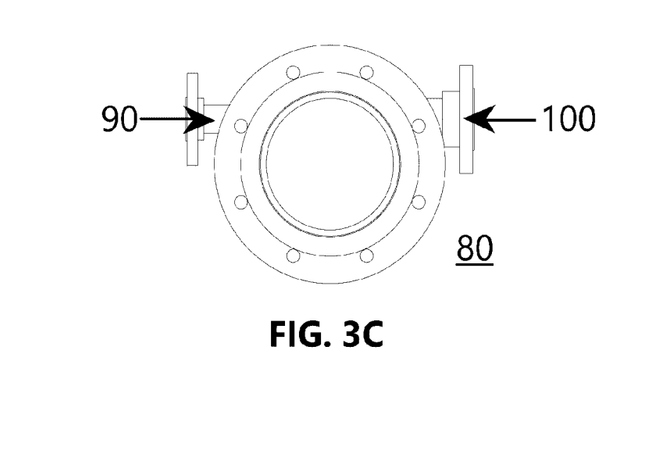
Figure 3D:
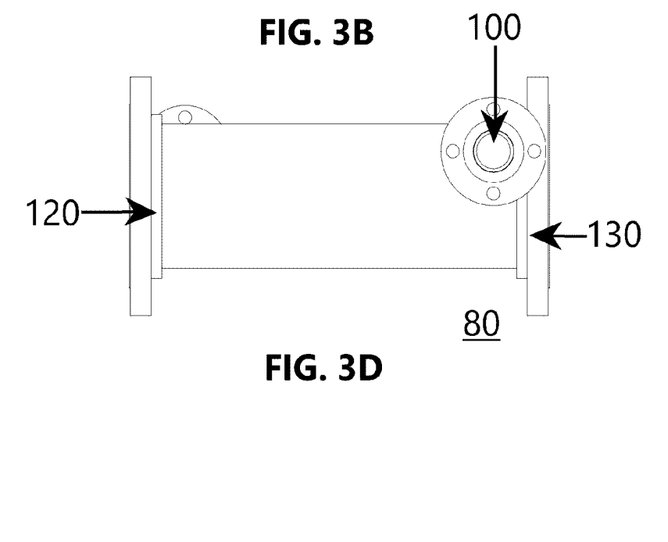
FIG. 3D is a side view of the cylindrical reactor vessel.

In FIGS. 3A-3D, the cylindrical reactor vessel 80 is shown in isolation in a perspective view (FIG. 3A), a top view (FIG. 3B), an end view (FIG. 3C) and a side view (FIG. 3D). As can be seen from the Figures, the inlet 90 is proximate to the first end 120 and the output 100 is proximate to the second end 130 of the cylindrical reactor vessel 80.

Figure 4:
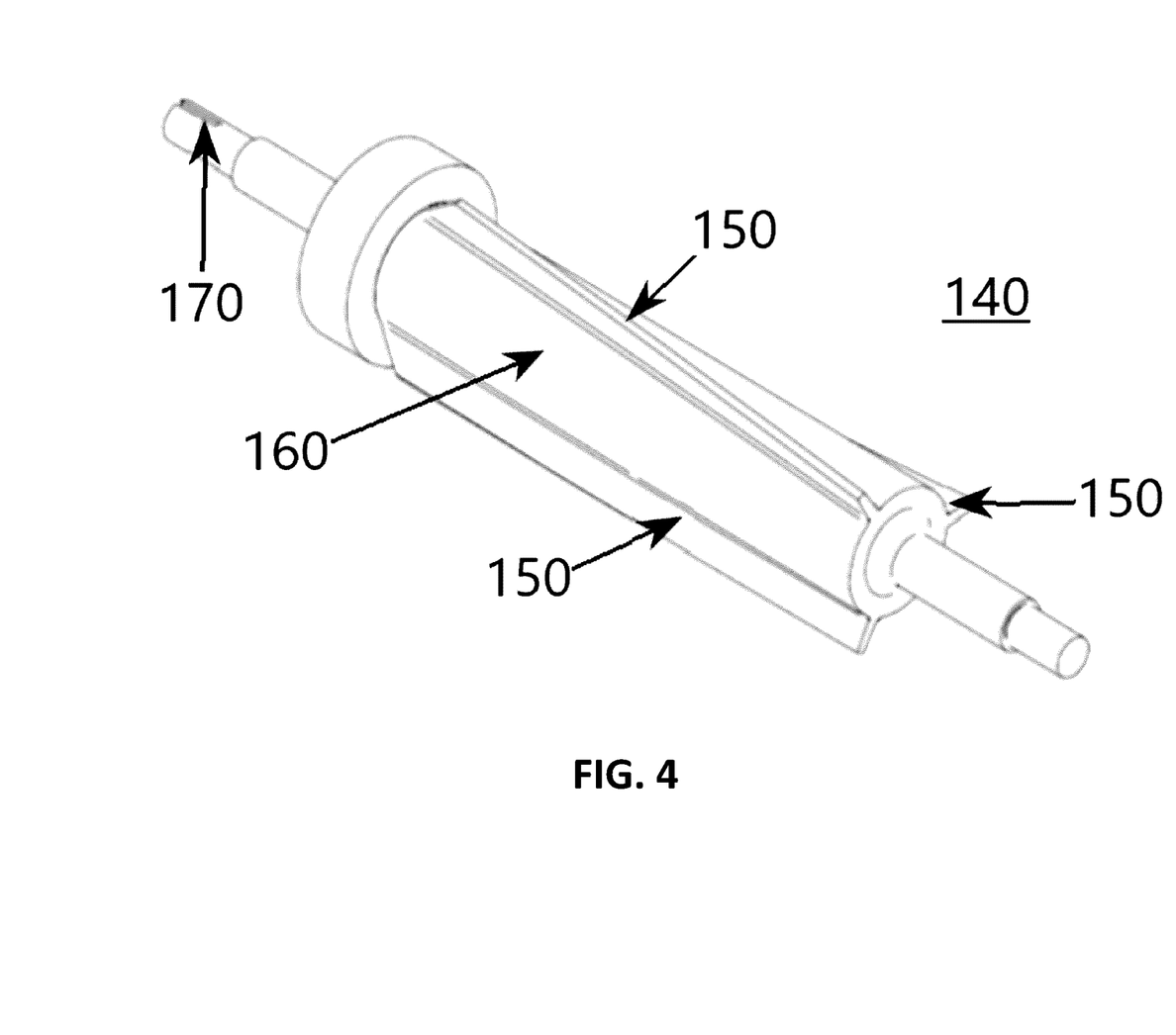
FIG. 4 is a perspective view of a rotor assembly of a reactor according to one embodiment of the present invention.

As previously mentioned, FIG. 4 illustrates a rotor assembly 140 of a reactor according to one embodiment of the present invention in a perspective view. In this embodiment, three rotor blades 150 are present on a cylindrical rotor 160. The rotor blades 150 are coupled at an angle θ of 30° from the circumferential plane of the rotor 160. The rotor 160 is also mounted on a shaft 170 to be coupled to a motor assembly (not shown) for rotation. For clarity, the circumferential plane of the rotor can be viewed as a plane that contains the axis of rotation of the cylindrical rotor but also splits or cuts the cylindrical rotor in two in a lengthwise manner.

Figure 5A:
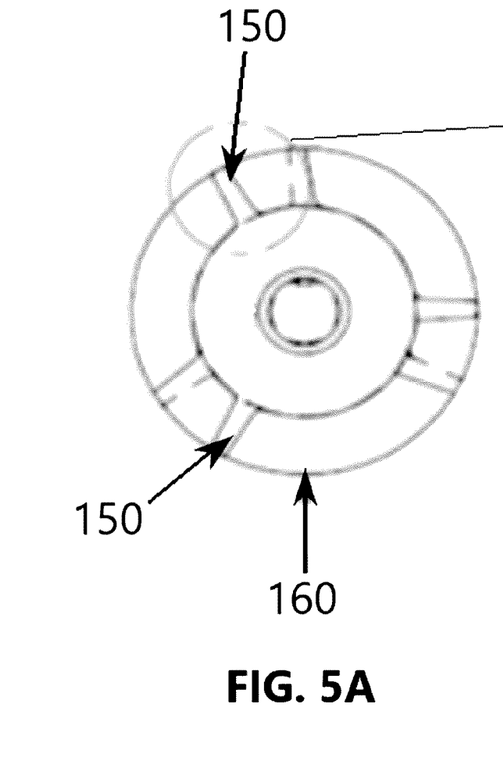
FIG. 5A is an end view of a rotor assembly of a reactor according to one embodiment of the present invention.
Figure 5B:
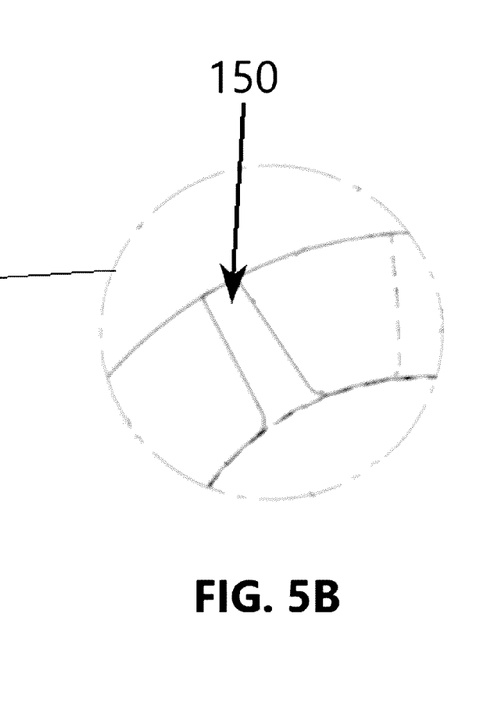
FIG. 5B is a sectional enlarged view of a rotor blade shown in FIG. 5A.

In FIGS. 5A-5B, an end view of the rotor assembly 140 is shown in FIG. 5A, with FIG. 5B showing an enlarged section of FIG. 5A (as indicated by broken lines) of one rotor blade 150. The solid lines of rotor blades 150 represent the visible edges of the blade as viewed from one end. The edges of the other end, being offset following an angle θ, are shown as solid lines (for the visible side) and as stippled lines (for the invisible side at the back of the tilted rotor blades 150).

Figure 6:
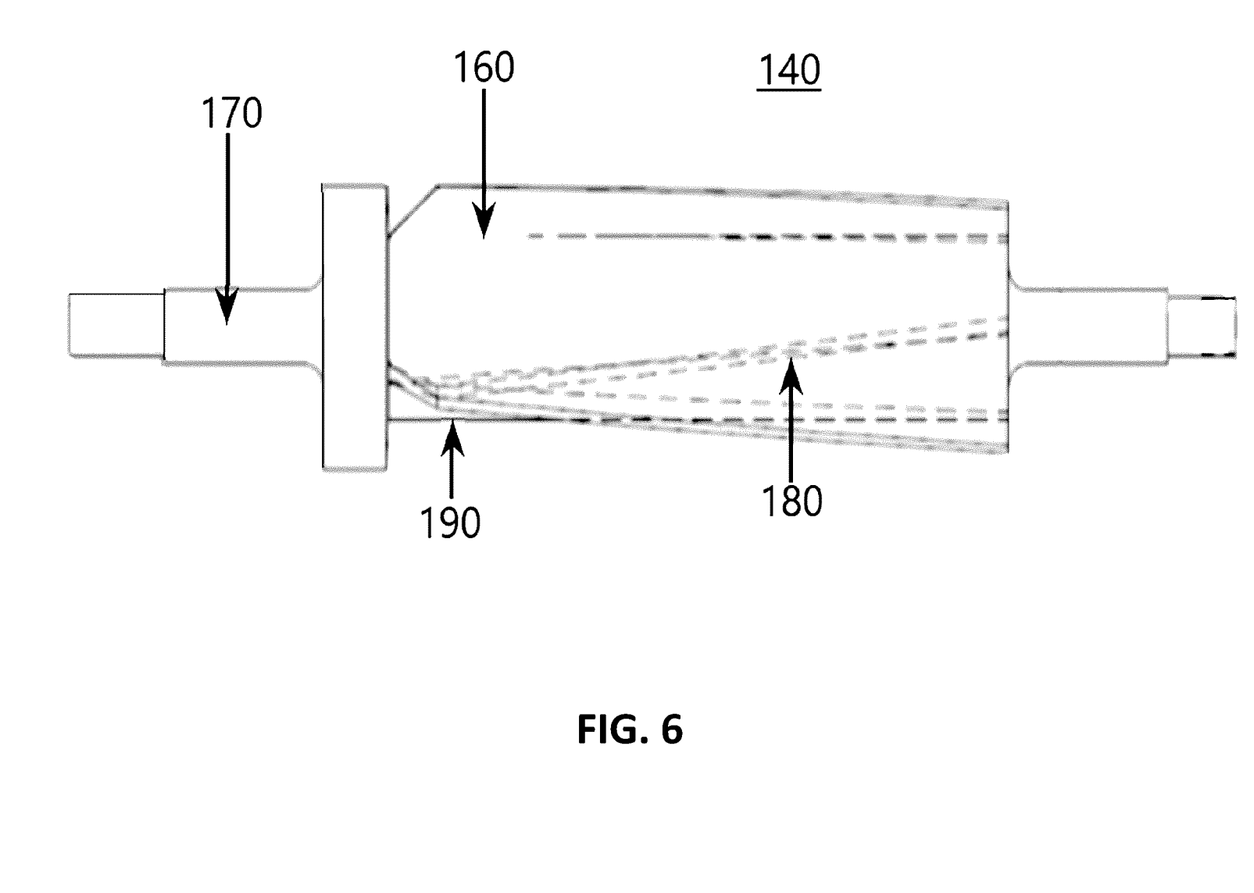
FIG. 6 is a side view of a rotor assembly of a reactor according to one embodiment of the present invention.

FIG. 6 shows a side view of a rotor assembly 140 according to one embodiment of the present invention. The rotor 160 is mounted on the shaft 170. Projections 180 of the rotor blades at an angle θ along the length of the rotor 160 are shown in stippled lines. Rotor 160 is also shown inclined from a horizontal plane 190 according to one embodiment of the present invention.

Figure 7:
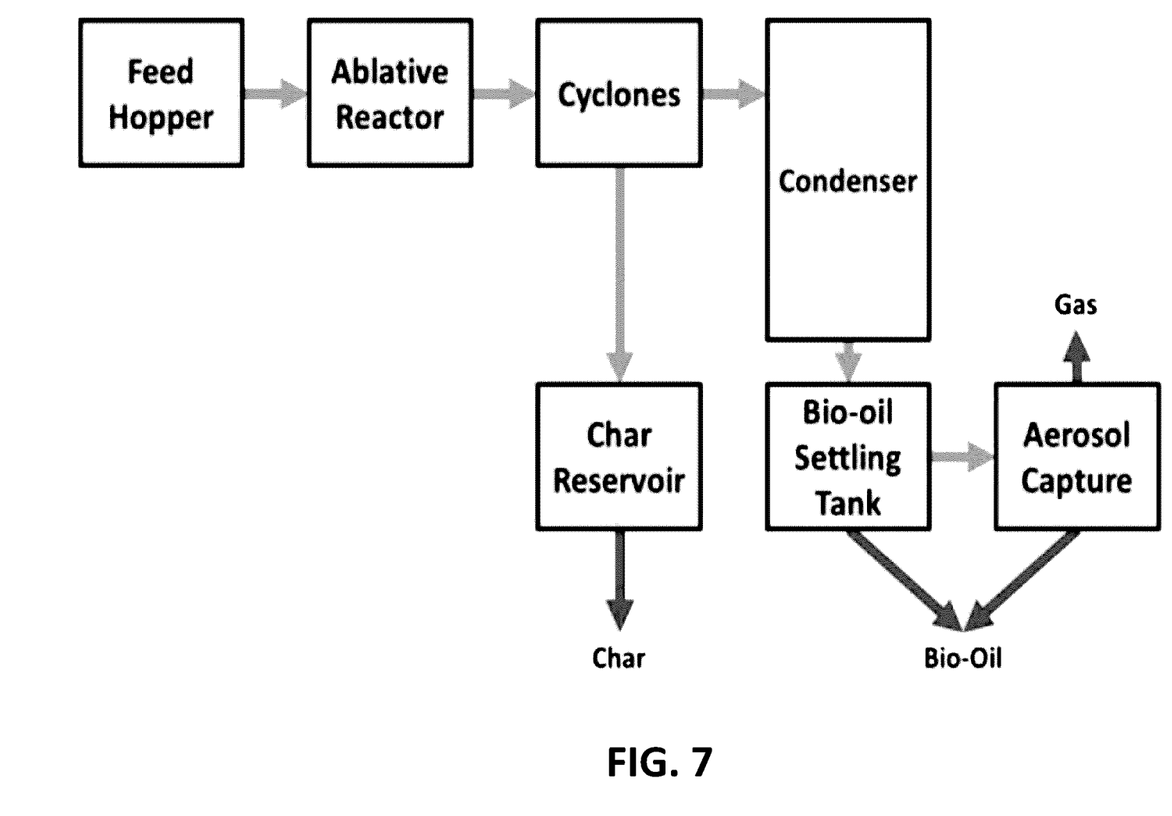
FIG. 7 is a flow diagram of a method according to one embodiment of the present invention.

The present invention may also provide a method for centrifuge pyrolysis of a feedstock. The method may use the reactor as described above. A flow diagram of a method according to one embodiment of the present invention is provided in FIG. 7. The method for pyrolysis may comprise providing a feedstock at the inlet of the reactor through a feeding system, such as, for example, by way of a feed hopper. The feeding system may include a feed auger for a constant feed rate of the feedstock within the reactor. For example, a feed rate from 0.5 kg/h to 10 kg/h may be contemplated for bench scale reactors while a feed rate of 0.5 tonne/h to 100 tonne/h in single or in multiple streams may be contemplated for commercial reactors including mobile or stationary operations.

The ablative pyrolysis step may comprise heating the heated surface and rotating the rotor to allow production of the pyrolysis products. The pyrolysis products may be collected at the outlet of the reactor and may be subjected to further separation and/or processing as deemed necessary. Any such processes known in the art may be contemplated. As exemplified in FIG. 7, the pyrolysis products are subjected to cyclones for separation. The separated solid pyrolysis products (char) may be transferred to a reservoir and the separated gaseous pyrolysis products may be subjected to condensation in a condenser. For example, a direct contact spray condenser using paraffin as a cooling fluid may be used. The condensed pyrolysis products may be transferred to further processing. When subjected to direct contact condensation, the condensed products may be transferred to a settling tank for separation of the bio-oil from the cooling fluid and non-condensed gas may be transferred to an aerosol capture apparatus.

It should be clear that any processing step may be supplemented and/or substituted by known techniques in the art. The method may also comprise recirculation of a product to an earlier stage of processing.

EXAMPLES

Figure 8A:
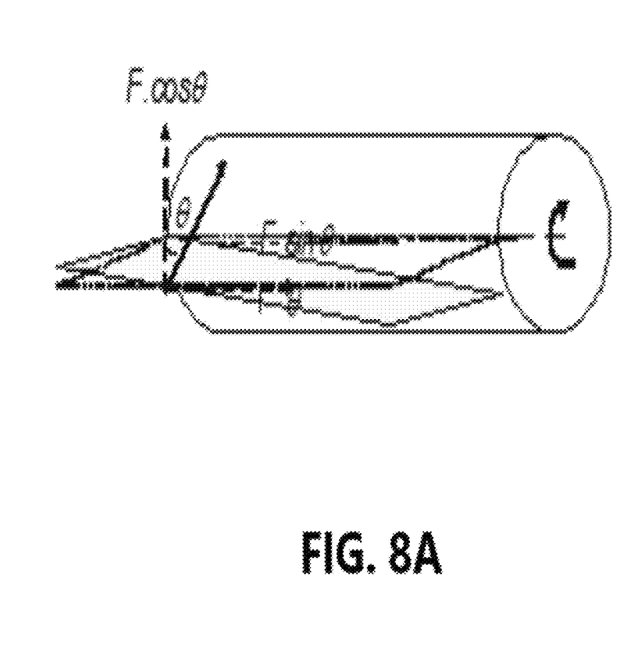
FIG. 8A-8B are schematic representations of forces induced by rotor blades according to one embodiment of the present invention
Figure 8B:
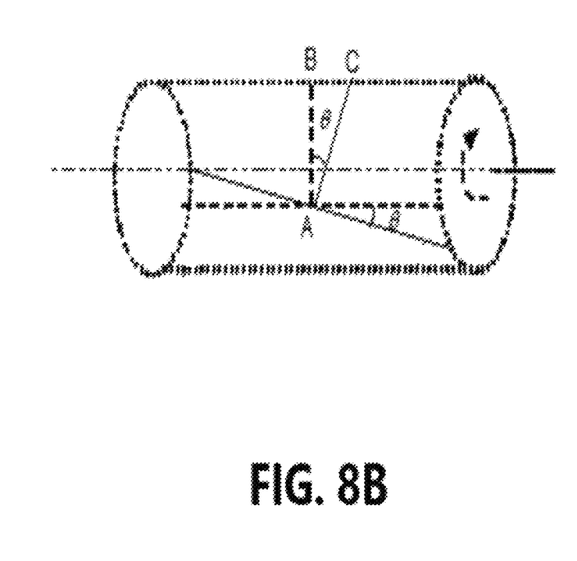

As explained above, straight radial blades known in the art do not contribute to axial propagation of feedstock particles in a centrifuge ablative reactor. However, according to the present invention, if the blades are tilted or curved at an angle θ with respect to a circumferential plane of the rotor (as the circumferential plane is defined above), the feedstock particles will be subjected to a force component F.sin θ that propagates the particles in the axial direction towards the outlet. FIGS. 8A-8B provide schematic representations of forces induced by rotor blades inclined at an angle θ. For a given rotation speed n (revolutions per second), the axial velocity of the particle can be given by $$v_{axial} = \pi \cdot n \cdot d_r \cdot \tan\theta$$

and the particle residence time can be given by $$\tau_p = \frac{l_r}{\pi \cdot n \cdot d_r \cdot \tan\theta}$$

where $d_r$ is the diameter of the rotor blade (presumed to be equal to the shell diameter).

Design performance of the reactor may be evaluated in terms of dimensionless thermal Biot number and thermal Thiele number, relative measures used in heat transfer calculations. Biot number Bi gives a simple index of the ratio of the heat transfer resistances inside of and at the surface of a body, i.e. the rotor. Bi is given by:

$$Bi = \frac{hL_0}{\lambda}$$

where h is the external heat transfer coefficient, $L_0$ is the characteristic particle length and λ is the particle thermal conductivity.

Thiele number Th describes the relationship between heat diffusion and reaction rate and is given by:

$$Th = \frac{r_p L_0^2 c_p}{\lambda}$$

where $r_p$ is the rate of reaction and $c_p$ is the specific heat.

Finally, the external transfer coefficient h is given by:

$$h = \frac{1}{118(s+1)} d_p \rho g G$$

where s=2 for spherical particles, $d_p$ is the particle diameter, ρ is the particle density, G is the dimensionless centrifugal acceleration and g is the gravitational acceleration.

In an ablative regime, both Bi and Th numbers need to be greater than 1. As such, examples of parameters of the present invention are given in Table 1.

TABLE 1

Variations of parameter values

| Inputs | | | | | Calculated values | | | | |
|---|---|---|---|---|---|---|---|---|---|
| Reactor diameter, mm | Blade angle θ | Reactor length $l_r$, mm | Particle size $d_p$, mm | Rotation speed, krpm | Centrifugal acceleration, kG | Heat transfer coefficient h, $W \cdot m^{-2} \cdot K^{-1}$ | Particle residence time $\tau_p$, s | Biot number $B_i$ | Thiele number Th |
| 75 | 5 | 500 | 2 | 5 | 1.1 | 38 | 0.2911 | 0.1 | 594 |
| 150 | | | | | 21.1 | 76 | 0.1455 | 0.2 | |
| | 10 | | | 10 | 84.0 | 302 | 0.0361 | 0.8 | |
| | 30 | | | 20 | 33.6 | 1209 | 0.0055 | 3.1 | |
| | 5 | | 10 | 5 | 21.0 | 378 | 0.1455 | 4.8 | 14861 |
| | 10 | | | 10 | 84.0 | 1511 | 0.0361 | 19.4 | |
| | 30 | | | 20 | 33.6 | 6046 | 0.0055 | 77.5 | |
| | 5 | | 20 | 5 | 21.0 | 756 | 0.1455 | 19.4 | 59445 |
| | 10 | | | 10 | 84.0 | 3023 | 0.0361 | 78.0 | |
| | 30 | | | 20 | 33.6 | 12091 | 0.0055 | 310.0 | |
| 300 | | | | 5 | 42.0 | 1511 | 0.0110 | 39.0 | |

Reactor wall temperature Tw = 500° C.

As previously stated and as exemplified in Table 1, for a given temperature, many variables can be varied for optimal performance of the reactor. For example, the reactor diameter ($d_r$), the rotor speed, the reactor length, the angle of the rotor blades (θ), the particle size of the feedstock ($d_p$), etc. A skilled person in the art would understand that optimization of the parameters is within the scope of the present invention.

Moreover, experiments were conducted on two exemplary feedstocks, namely softwood and hardwood sawdust as follows.

EXPERIMENTAL PROCEDURES

The surface temperatures of the reactor, cyclones, and char drains were raised from room temperature to approximately 200° C. as a warm-up stage. Once surface temperatures reached 200° C., nitrogen was allowed to flow through the system and was also initially raised to the same temperatures as the hot surface temperatures. While the temperatures were rising, ISOPAR™ V circulation was also initiated in the condenser, whose mass flow rate was approximately 200 kg/hr. Temperatures were steadily raised until the reactor surface temperatures measured 500° C. and internal temperatures at the cyclone exits reached 450-480° C. Moreover, the internal temperatures of the char drains lines were approximately 400° C. Feedstock was fed into the feeder and the auger was started, allowing feeding of feedstock to the reactor when the reactor was rotating at 2000 RPM.

The end of the experiment was marked by stopping the feeding of biomass, regardless of complete consumption of the biomass. Once feeding stopped, the reactor rotor was allowed to continue rotating for an additional 15 minutes to ensure removal of any accumulated material. Heating of cyclones and char drains was also stopped once feeding ended. Cooling water, refrigerant, and ISOPAR V circulation was allowed to continue for 45-60 minutes after the end of the experiment. During this procedure, nitrogen was also allowed to flow through the system, and was steadily decreased as the system purged and cooled down. Bio-oil was collected from three recovery locations 1 hour after, 1 day after, and 5 days after the experiments. These recovery locations were the bio-oil (settling) separation tank, the ISOPAR V holding tank, and any condensed oil following the demisters. Char was also removed from both char reservoirs 1 day after the experiment. In the case that all feedstock was not consumed, any remaining feedstock was vacuumed out of the feed hopper and its weight recorded.

Experiment 1

The experiment was conducted on 10 kg of softwood for a continuous duration of 3 hours and 19 minutes.

Experiment 2

The experiment was conducted on 13 kg of hardwood sawdust for a continuous duration of 3 hours and 27 minutes.

Experiment 3

The experiment was conducted on 13 kg of hardwood sawdust for a continuous duration of 2 hours and 54 minutes.

A summary of the liquid and solid yields for each experiment is provided in Tables 2, 3, and 4. These yields do not include the loss of organic content gas phase primarily in the form of aerosols and uncondensed vapours.

TABLE 2

Product yields for Experiment 1

| | | Products | | |
|---|---|---|---|---|
| Parameter | Feedstock | Bio-oil | Char | Gas | Total |
| Mass (kg) | 8.65 | 2.61 | 1.37 | N/A | 3.96 |
| Yield (%) | — | 30.0 | 15.8 | N/A | 45.8 |

TABLE 3

Product yields for Experiment 2

| | | Products | | | |
|---|---|---|---|---|---|
| Parameter | Feedstock | Bio-oil | Char | Gas | Aerosols | Total |
| Mass (kg) | 11.28 | 4.45 | 1.26 | 1.01 | 2.03 | 9.2 |
| Yield (%) | — | 39.5 | 11.8 | 9.0 | 18.0 | 77.7 |

TABLE 4

Product yields for Experiment 3

| | | Products | | | |
|---|---|---|---|---|---|
| Parameter | Feedstock | Bio-oil | Char | Gas | Aerosols | Total |
| Mass (kg) | 12.46 | 6.32 | 1.34 | 1.28 | 1.94 | 10.88 |
| Yield (%) | — | 50.7 | 10.7 | 10.3 | 15.6 | 87.3 |

A person understanding this invention may now conceive of alternative structures and embodiments or variations of the above all of which are intended to fall within the scope of the invention as defined in the claims that follow.

What is claimed is:

1. A reactor for centrifuge pyrolysis of a feedstock, the reactor comprising:
    a cylindrical reactor vessel having a first end and a second end, and having an inlet proximal to the first end for receiving the feedstock and an outlet proximal to the second end for discharging at least one pyrolysis product;
    a heated surface defining an inner wall of the cylindrical reactor vessel;
    a cylindrical rotor concentric to the cylindrical reactor vessel along a longitudinal central axis, the longitudinal central axis being coincidental with an axis of rotation of the cylindrical rotor; and
    at least one rotor blade coupled to the cylindrical rotor along a length of the cylindrical rotor such that the or each at least one rotor blade defines a respective plane that is angled away from a circumferential plane such that each of said respective planes defined by the or each at least one rotor blade is bisected by the circumferential plane, wherein the circumferential plane is a plane on which the axis of rotation of the cylindrical rotor lies and which bisects the cylindrical rotor lengthwise, wherein the axis of rotation does not lie on the respective planes defined by the or each at least one rotor blade, wherein the or each at least one rotor blade projects radially outwards from said cylindrical rotor, and wherein the or each at least one rotor blade is non-tangential to said cylindrical rotor;
    wherein the cylindrical rotor is for rotation about the longitudinal central axis to impel a centrifugal force to the feedstock for contacting the heated surface to thereby result in the at least one pyrolysis product; and
    wherein the or each at least one rotor blade is configured for facilitating propagation of the feedstock in an axial direction from the first end to the second end.

2. The reactor according to claim 1, wherein the feedstock comprises at least one organic material selected from the group consisting of: biomass, agriculture and forestry residues, municipal solid waste, construction and demolition residues, and plastics.

3. The reactor according to claim 1, wherein the heated surface is at a temperature of at least 300° C., and at most 650° C.

4. The reactor according to claim 1, wherein the cylindrical rotor is for rotation at a speed of at least 500 rpm, and at most 20,000 rpm.

5. The reactor according to claim 1, wherein the at least one rotor blade is present in an integer of at least 1, and at most 5.

6. The reactor according to claim 1, wherein an angle between said respective plane and said circumferential plane is at least 1°, and at most 45°.

7. The reactor according to claim 1, wherein the at least one rotor blade comprises at least two rotor blades and wherein an angle between the respective planes defined by each of the at least two rotor blades and the circumferential plane is a same angle θ.

8. The reactor according to claim 1, wherein the cylindrical reactor vessel is oriented horizontally or at an inclined angle from the horizontal.

9. The reactor according to claim 1, wherein the at least one pyrolysis product comprises at least one of: char, pyrolysis gases and pyrolysis liquids.

10. The reactor according to claim 1, wherein the at least one rotor blade comprises at least two rotor blades and wherein an angle between each of the respective planes defined by each of the at least two rotor blades and the circumferential plane is a different angle.

11. A method for centrifuge pyrolysis of a feedstock, the method comprising:

providing a reactor comprising:

a cylindrical reactor vessel having a first end and a second end, and having an inlet proximal to the first end for receiving the feedstock and an outlet proximal to the second end for discharging at least one pyrolysis product;

a heated surface defining an inner wall of the cylindrical reactor vessel;

a cylindrical rotor concentric to the cylindrical reactor vessel along a longitudinal central axis, the longitudinal central axis being coincidental with an axis of rotation of the cylindrical rotor; and at least one rotor blade coupled to the cylindrical rotor along a length of the cylindrical rotor such that the or each at least one rotor blade defines a respective plane that is angled away from a circumferential plane such that each of said respective planes defined by the or each at least one rotor blade is bisected by the circumferential plane, wherein the circumferential plane is a plane on which the axis of rotation of the cylindrical rotor lies and which bisects the cylindrical rotor lengthwise, wherein the axis of rotation does not lie on the respective planes defined by the or each at least one rotor blade, wherein the or each at least one rotor blade projects radially outwards from said cylindrical rotor, and wherein the or each at least one rotor blade is non-tangential to said cylindrical rotor;

wherein the cylindrical rotor is for rotation about the longitudinal central axis to impel a centrifugal force to the feedstock for contacting the heated surface to thereby result in the at least one pyrolysis product; and wherein the or each at least one rotor blade is configured for facilitating propagation of the feedstock in an axial direction from the first end to the second end;

b) providing the feedstock in the inlet of the reactor;
c) generating heat at the heated surface;
d) rotating the cylindrical rotor for centrifuge pyrolysis of the feedstock; and
e) collecting the at least one pyrolysis product from the outlet of the reactor.

12. The method according to claim 11, wherein the feedstock comprises at least one organic material selected from the group consisting of: biomass, agriculture and forestry residues, municipal solid waste, construction and demolition residues, and plastics.

13. The method according to claim 11, wherein step c) comprises generating heat at a temperature of at least 300° C., and at most 650° C.

14. The method according to claim 11, wherein step d) comprises rotating the cylindrical rotor at a speed of at least 500 rpm, and at most 20,000 rpm.

15. The method according to claim 11, wherein there are at least one and at most 5 of the at least one rotor blade.

16. The method according to claim 11, wherein an angle between said respective plane and said circumferential plane is at least 1°, and at most 45°.

17. The method according to claim 11, wherein the at least one rotor blade comprises at least two rotor blades and wherein an angle between the respective planes defined by each of the at least two rotor blades and the circumferential plane is a same angle θ.

18. The method according to claim 11, wherein the cylindrical reactor vessel is oriented horizontally or at an inclined angle from the horizontal.

19. The method according to claim 11, wherein the at least one pyrolysis product comprises at least one of: char, pyrolysis gases, and pyrolysis liquids.

20. The method according to claim 11, wherein at least two pyrolysis products are collected in step e) and the method further comprises a step of separating the at least two pyrolysis products.

21. The method according to claim 11, wherein the at least one rotor blade comprises at least two rotor blades and wherein an angle between each of the respective planes defined by each of the at least two rotor blades and the circumferential plane is a different angle.

* * * * *